United States Patent
Florey et al.

(10) Patent No.: US 10,470,023 B2
(45) Date of Patent: Nov. 5, 2019

(54) EMERGENCY CLAIM RESPONSE UNIT

(71) Applicant: Florey Insurance Agency, Inc., Clarks Summit, PA (US)

(72) Inventors: Thomas E. Florey, South Abington Township, PA (US); Hector A. De La Cruz, Exeter, PA (US)

( * ) Notice: Subject to any disclaimer, the term of this patent is extended or adjusted under 35 U.S.C. 154(b) by 0 days.

(21) Appl. No.: 15/872,369

(22) Filed: Jan. 16, 2018

(65) Prior Publication Data
US 2019/0222994 A1   Jul. 18, 2019

(51) Int. Cl.
| | |
|---|---|
| *H04W 4/90* | (2018.01) |
| *H04N 7/18* | (2006.01) |
| *H04N 7/15* | (2006.01) |
| *G06Q 50/26* | (2012.01) |
| *H04L 29/06* | (2006.01) |
| *G06Q 40/08* | (2012.01) |
| *H04W 4/02* | (2018.01) |

(52) U.S. Cl.
CPC .............. *H04W 4/90* (2018.02); *G06Q 40/08* (2013.01); *G06Q 50/265* (2013.01); *H04L 65/1069* (2013.01); *H04N 7/15* (2013.01); *H04N 7/185* (2013.01); *H04W 4/02* (2013.01)

(58) Field of Classification Search
USPC ....................................................... 379/37
See application file for complete search history.

(56) References Cited

U.S. PATENT DOCUMENTS

| | | | | |
|---|---|---|---|---|
| 2003/0012344 A1* | 1/2003 | Agarwal | ................ | H04M 11/04 379/37 |
| 2009/0186596 A1* | 7/2009 | Kaltsukis | ............... | G08B 25/08 455/404.2 |
| 2014/0278585 A1* | 9/2014 | Zerbib | .................... | G06Q 40/08 705/4 |
| 2018/0082379 A1* | 3/2018 | Kelsh | ..................... | G06Q 50/22 |
| 2018/0091930 A1* | 3/2018 | Jefferies | ................ | H04L 67/125 |

* cited by examiner

*Primary Examiner* — Maria El-Zoobi
(74) *Attorney, Agent, or Firm* — Zale Patent Law, Inc.; James R. McDaniel; Lawrence P. Zale (57) ABSTRACT

A system 1000 enables an Emergency Claim Response Person (ERCP) 13 to remotely take control of an emergency situation via a live video link by directing an insured at the accident scene to take certain actions and acquire information and videos required for filing an insurance claim. The system 1000 includes an insured 1 using a smartphone 200 loaded with a proprietary App 211 that connects with the ECRP 13 at an emergency claim response unit (ECRU) 300 through a compatible video hosting server. The ECRP calms the insured 1 and instructs the insured 1 through the post-accident process. The ECRU 300 finds and requests the appropriate ambulance company, police and fire departments, when necessary. The ERCP 13 directs the insured 1 to video the accident scene, vehicle positions/orientation, and damage. The ECRU 300/ECRP 13 also instruct the insured to provide the insured's smartphone 200 to others to acquire video statements.

10 Claims, 4 Drawing Sheets

EMERGENCY CLAIM RESPONSE UNIT

CROSS REFERENCE TO RELATED APPLICATIONS

This application is related to U.S. Ser. No. 15/806,727 filed Nov. 8, 2017 by T. Florey and H. De La Cruz entitled "Instant Agent" which is hereby incorporated by reference as if set forth in its entirety herein to the extent that it does not conflict with this application.

FIELD

The current invention relates to a system that, in the event of an accident, or other insured event, notifies first responders, allows a remote emergency claim response person (ECRP) to direct an insured to acquires information and videos for an insurance claim; and more specifically to a system that, in the event of an accident, or other insured event, immediately notifies first responders, allows the ECRP to direct the insured via video link on what to do, and acquires information and videos for an insurance claim.

BACKGROUND

After an auto accident or other insurable event, such as a house fire, dog bite, slip and fall injury, etc. (collectively referred to as an "Accident"), those involved are typically nervous and disoriented. Sometimes those involved are injured and need emergency care.

The average person does not typically get in many Accidents, and if they were, it was probably a long time ago. They tend to forget how to request first responders, such as ambulance, police, fireman, what the procedure for reporting an Accident is, and what information is required. These may be referred to as a post-accident procedure.

The most urgent need after an Accident is to take care of the injured.

It is also important to find out who witnessed the accident, since these people leave the scene quickly.

There are also those in the cars involved in the tragedy, such as passengers in a vehicle involved in an accident. They may be referred to as 'accident participants'.

Many times, vehicles involved in the accident may be blocking traffic or otherwise must be moved. After they are moved, it alters the scene of the Accident.

Similarly, the accident scene 19 can be changed shortly after other Accidents, such as a house fire.

At some later time, it may be important to have accurate information of the accident scene to determine fault, liability, and reimbursement from an insurance company.

After the emergency actions have been implemented, other post-accident procedure steps are performed, such as acquiring information and video feed for the insurance claims process.

The insurance claims process is the process of notifying the insurance company of damage and expenses that occurred, which are then verified by an Adjuster of the insurance company (the "Carrier"). An insurance claim is filed for reimbursement for medical expenses, and/or damage due to Accidents. The insurance claim is later processed and the insured is paid by the Carrier.

Many of those insured who have made an insurance claim complain that the time it takes to process a claim and receive payment is too long and can be shortened.

It takes time for an Adjuster at the insurance company to collect the relevant information, determine the amount of damages.

Typically, the amount of damage is determined by an insurance adjuster and/or appraiser (collectively referred to as the 'Adjuster'). The Adjuster rarely can be at an Accident scene before it is changed or even cleared. The Adjuster may also drive to a location where the damaged car is stored, such as a body shop, and determine the amount of damage, or to a house which has recently burned down, or to visit a patient in the hospital after an injury, etc.

The Adjuster may also visit the accident site later to acquire information or assess the damage at the site.

After an Accident, the injured are quickly transported to a hospital. In auto accidents, vehicles, if not drivable, are also quickly towed away to open the road to traffic again. In most Accidents, the witnesses typically leave, many times without providing their identity or providing a statement.

Therefore, much of the information is provided by a police report written by a policeman who has no personal knowledge of the Accident, and can only speculate on how it happened. The site is typically changed by the time the policeman reaches it.

The policeman also acquires information through the people on the scene after they have had some time to think about the Accident and possibly call and talk with others about it.

As time goes on, the insured may receive suggestions to alter the facts to put him/her in a better position.

Also, since an Accident is typically a traumatic event, the insured is nervous, upset, emotional and has trouble communicating and providing accurate descriptions. They tend to provide descriptions which are inaccurate, with little description and tend to leave out relevant facts.

The witnesses are usually non-biased, not as emotional and a better source of information. However, they may leave before the police arrive to interview them.

The police write a report which typically is missing information and is written through the perception of the policeman. This may further color the report.

The Adjuster later must fill in missing information. The Adjuster may not have any information on the witnesses, is missing statements from those in the accident and supplements this with information acquired later from those who were involved with the accident. Even several days later, memories, fade, those involved tend to listen to friends and color the facts.

Currently, there is a need to calm those involved in the accident, quickly request first responders, and more quickly and accurately acquire information required for an insurance claim.

BRIEF DESCRIPTION OF SEVERAL VIEWS OF THE DRAWINGS

The above and further advantages may be better understood by referring to the following description in conjunction with the accompanying drawings, in which like numerals indicate like structural elements and features in various figures. The drawings are not necessarily to scale; emphasis instead being placed upon illustrating the principles of the concepts. For example, the dimensions of some of the elements in the figures may be exaggerated relative to other elements to help to improve understanding of various example embodiments. Also, common but well-understood elements that are useful or necessary in a commercially feasible embodiment are often not depicted to facilitate a less obstructed view of these various example embodiments.

DETAILED DESCRIPTION

At least some of the following exemplary embodiments provide an improved system and method suitable for requesting, automatically configuring and participating in live video conferences. Many other advantages and improvements will be discussed in more detail below, or will be appreciated by the skilled person from carrying out exemplary embodiments based on the teachings herein. The exemplary embodiments have been described particularly in relation to the insurance industry. However, it will be appreciated that the example embodiments may be applied in many other specific uses.

Theory

After an Accident, certain actions are time-sensitive. Most importantly, it must be determined if anyone requires medical care. If so this should be requested immediately. Since ambulance companies only cover certain areas and if an area is covered by more than one, it is best to contact the one which can be at the accident scene first. Usually, when there is an accident, those involved in the accident do not know which ambulance company covers the location of the accident. There is the 911 emergency service; however, sometimes those involved in the accident do not feel that the accident is large enough to be considered an 'emergency' and are reluctant to contact 911. This is also the case with contacting the police, fire company and other first responders.

In an auto accident, if vehicles are blocking traffic, it is determined if a towing service is necessary. If so, an appropriate company is contacted.

The people who may have first-hand information on the Accident, witnesses, quickly leave the scent and cannot be found later if needed. It is possible that by the time the police arrive at the scene, some of those involved in the accident leave the scene and cannot be contacted later.

In an auto accident, if the vehicles are blocking traffic, they are quickly moved to allow traffic to flow. Therefore, it is up to those at the scene to describe the resting locations of the vehicles, their orientations. Sometimes these descriptions are not consistent and there is no way to prove their locations and orientations. This information may be valuable later in recreating the accident.

Implementation

Figure 1:
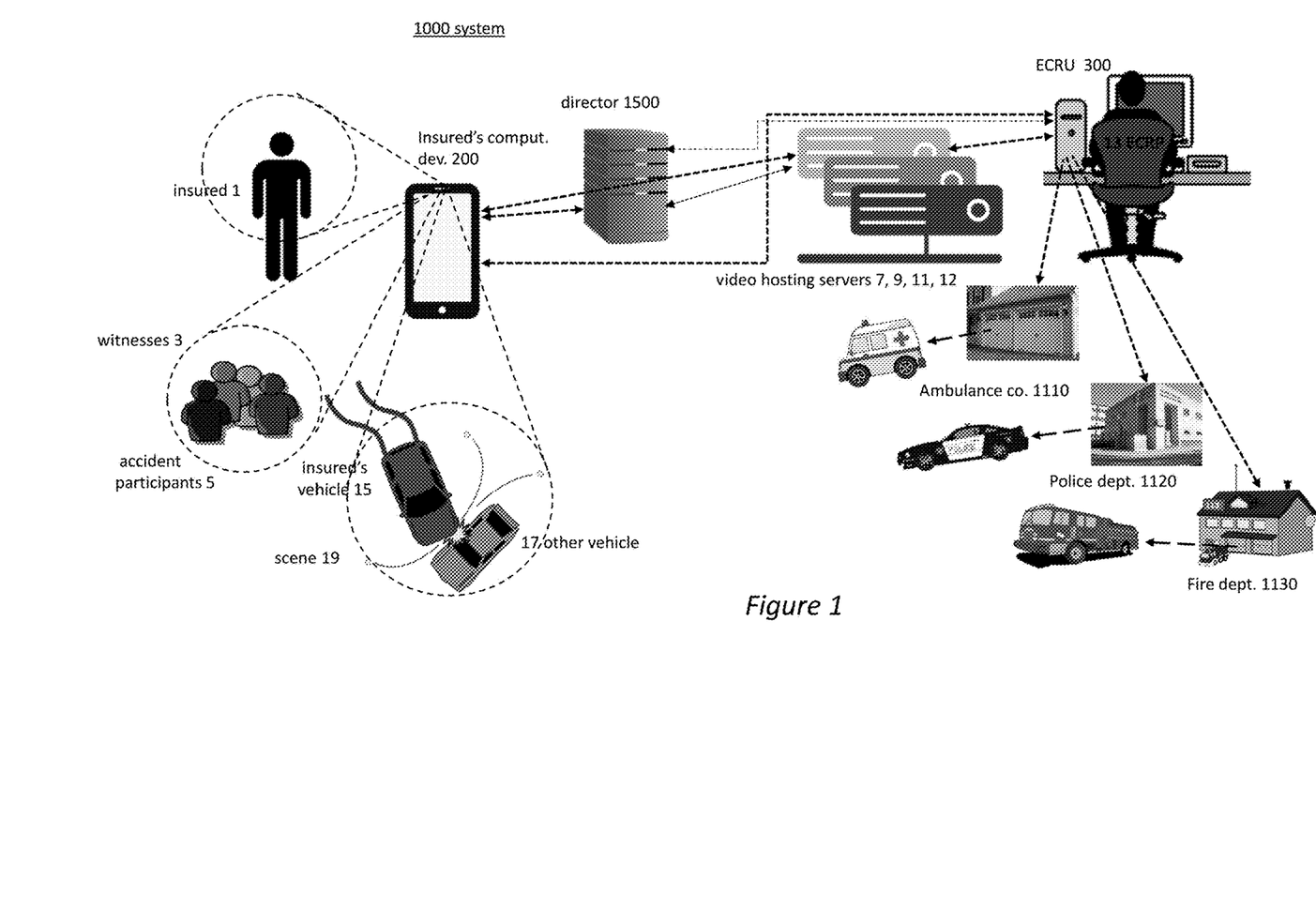
FIG. 1 is a general block diagram of one embodiment of a system in accordance with the present invention illustrating its implementation after an auto accident.

FIG. 1 is a general block diagram of one embodiment of a system in accordance with the present invention illustrating its implementation after an auto accident.

Figure 2:
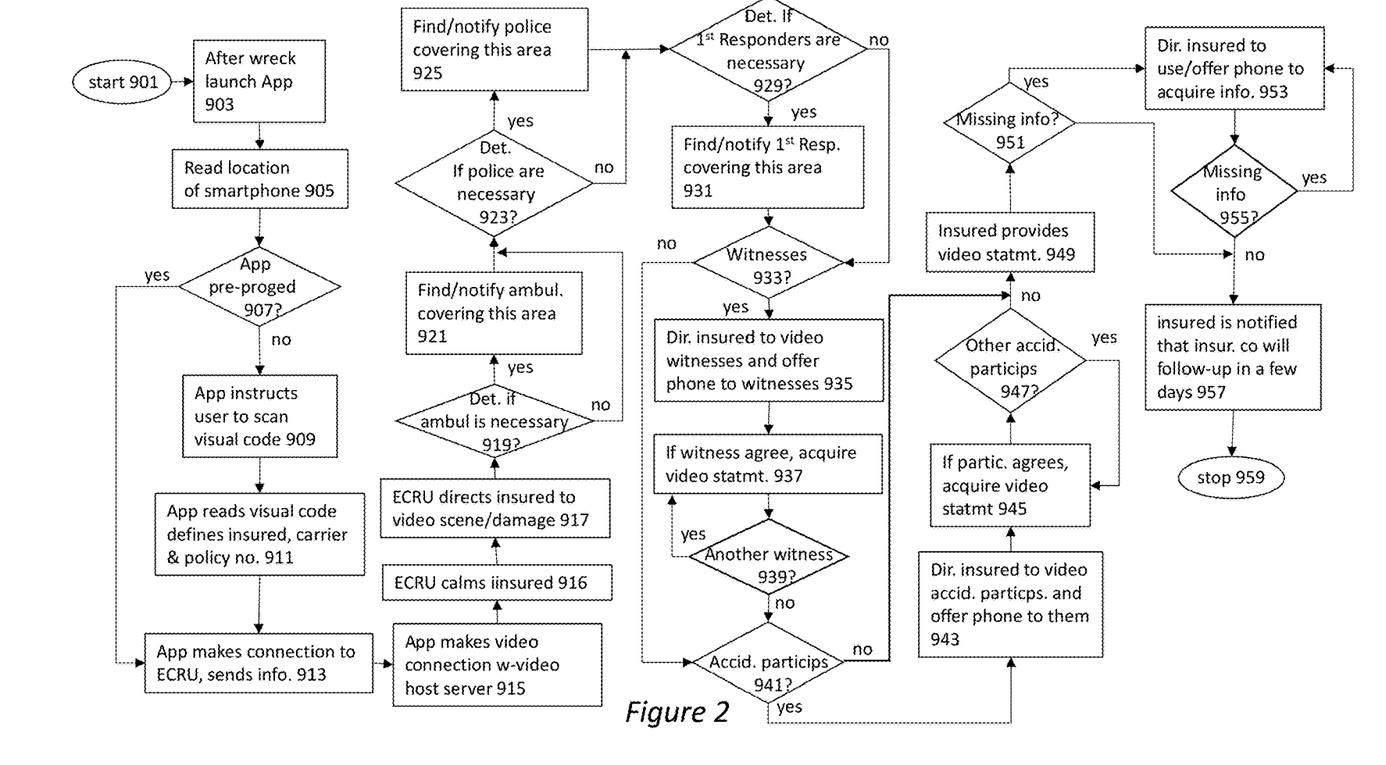
FIG. 2 is a simplified flowchart illustrating the major steps of a process according to the current invention.

FIG. 2 is a simplified flowchart illustrating the major steps of a process according to the current invention.

Figure 3:
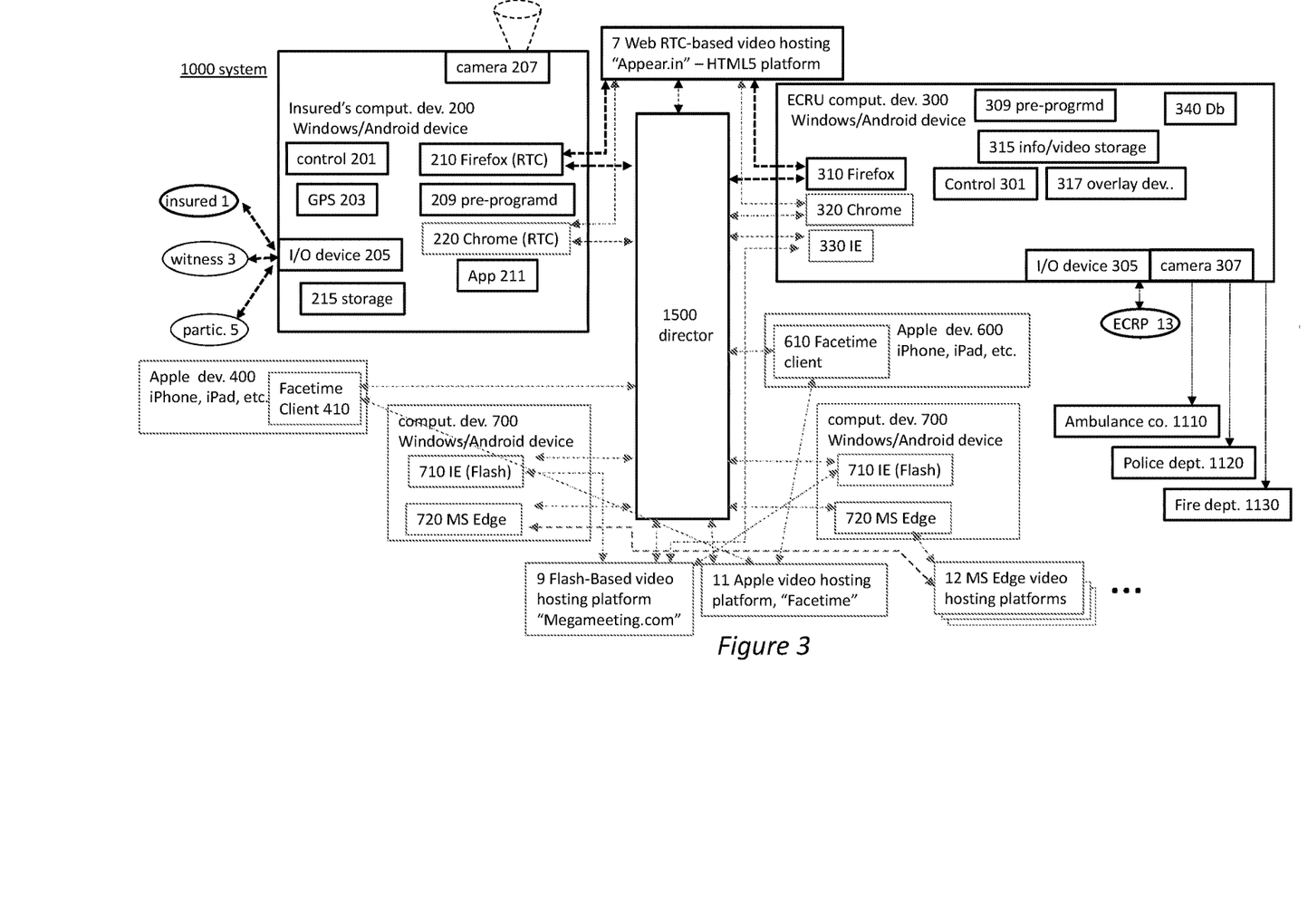
FIG. 3 is a more detailed block diagram of a system in accordance with the current invention.

FIG. 3 is a more detailed block diagram of a system in accordance with the current invention.

An exemplary embodiment of the system 1000 according to the current invention will be described in connection with the general system diagram of FIGS. 1 and 3 and the flowchart of FIG. 2 with respect to an auto accident. However, it is to be understood that even though an auto accident was chosen to be described in detail for illustrative purposes, the current invention applies equally to any Accident or situation which the injuries and/or damages are at least partially covered by insurance.

Initially, an insured 1 in insured's vehicle 15 is involved in an accident with another vehicle 17 at accident scene 19. This may be observed by one or more witnesses 3. There also may be one or more participants 5, in addition to the driver(s), such as passengers in the vehicles 15, 17 involved in the Accident.

Auto-Configuration

System 1000 may be configured before use by at least three different methods, a) by a pre-programmed App, b) by scanning a visual code; or c) by directing a generic web browser to a compatible video server.

a. Pre-Programmed App

It may be pre-configured by the insured's agent, a member of the insured's carrier company or by the insured 1 using instructions from the agent or carrier company, possibly on-line. This may be done by following steps on a website which allow specific information on the insured 1 to be entered into the App 211 on the insured's computing device 200. The information entered may include the name of the insurance carrier, the policy number, coverage options, and other insurance policy information. It may also include the information indicating the insured's computing device 200 hardware type (Ex. Samsung galaxy II), operating system (Ex. Android KitKat), and communication software (Ex. Firefox with version number) to be used to connect. It also may store a URL link to the compatible video hosting server (Ex. Web RTC-based video hosting service "Appear.in", an HTML5 platform). This will allow insured's computing device 200 to make a direct link to the video hosting server requiring little or no interaction with the director 1500 and would be an alternative embodiment of the system 1000.

b. Scanning a Visual Code

The insured's computing device 200 includes a camera 207 and executable code in the App 211 that causes it to extract codes in a visual image scanned by camera 207. These visual codes include a URL to director 1500. Once contact is made to director 1500, information decoded from the visual image (such as that indicate above for the pre-stored information) is provided to director 1500 to identify the insured 1 and possibly, the insured's computing device 200 to be used to connect.

Director 1500 as indicated in the above referenced related patent application, then determines a compatible video hosting server (Web RTC-based video hosting service "Appear.in", an HTML5 platform) which is indicated back to the insured's computing device 200 along with any other information required to make a video conference connection with the video conference server. The insured's computing device 200 now has the information to make a direct connection to the video conference server. The App 211 causes control unit 201 to make a video conference connection with the video hosting server and acquires a session number and other login information. The App 211 also causes control unit 201 to send a notification to the ERU 300 indicating the video hosting server being used, the conference number and the format being used for communications.

c. Directing a Generic Browser

The system 1000 is designed to make a video connection without the need for downloading software or apps. It also does not require configuration, but is auto-configured. It is assumed that the insured 1 is nervous and does not have the patience to download or configure Apps at this time. Previous systems which required downloads or configuration have not been used in the past or used very little for this reason.

Other aspects of the functioning of system 1000 are explained in more detail in the above-referenced related pending US Application by the same inventors.

The method of the current invention starts at step 901, just after the Accident. The insured 1 initiates a program of executable instructions, an App 211, on insured's computing device 200 in step 903.

This App 211 has preprogrammed logic to begin setting up and configuring the system 1000. Once configures, system 1000 will allow a remotely-located emergency claim response person (ECRP 13) to take control of the situation and provide specific step-by-step post-accident instructions to handle the situation after the accident. As indicated above, the insured and the accident participants 5 have been through a traumatic experience, and are nervous and disoriented. It is difficult for them to make simple decisions and answer simple questions. Therefore, certain actions are performed by system 1000 and a live ECRP 13 is available verbally to direct the insured through a live video link.

In step 905, the APP 211, reads an internal GPS (203 of FIG. 3) to determine the exact location of the insured's computing device 200. The App 211 asks the insured 1 if (s)he is at the accident scene 19. If the answer is "yes", then this is stored as the location of the accident, the accident scene 19.

In step 907 it is determined if the App 211 was preprogrammed with the information of the insured 1. If so, steps 909 and 911 are skipped and processing continues at step 913.

If the App 211 was not preprogrammed, then in step 909, the insured 1 is instructed to scan a visual code with camera 207, such as a QR code on their Insurance ID card, a sticker placed on their car, or on other papers provided by an insurance agent to the insured 1, preferably when they purchase insurance.

In step 911, the visual code provides information for the insured's computing device 200 to connect to the director 1500. The visual code can also provide other information such as the policy number, the insurance carrier, etc.

In step 913, the insured's computing device 200 contacts the director 1500 the director 1500 which reads the format to indicate the operating system and communication program being used. Director 1500 connects the insured's computing device 200 with an appropriate video hosting server 7, 9, 11, 12 compatible with the insured's computing device 200, as was described in pending U.S. application Ser. No. 15/806,727 filed Nov. 8, 2017 by T. Florey and H. De La Cruz entitled "Instant Agent".

Either the director 1500, or alternatively, the insured's computing device 200 notifies the ECRU 300 that the insured 1 is requesting an urgent video connection with the ECRP 13, and provides information as to the video hosting server, a video session number and password and information identifying insured 1.

In step 915, ECRU 300 connects to the same video hosting server and conference to set up a video session between the insured 1 and the ECRP 13.

The insured 1 has just experienced an accident, and is typically nervous and disoriented. In step 916, ECPR 13 is directed by ECRU 300, preferably on an input and output (I/O) device 305 to speak directly with insured 1 and take steps to calm down insured 1. Some of these prompts may be the acknowledgement that the insured 1 is upset, indicating that the ECRP 13 will be there every step of the way to walk the insured 1 through the process and that the ECRP 13 is experienced in this type of work and will make sure that there everything runs smoothly. This is one of the advantages of this system—immediate face-to-face conferencing with, and support from a trusted individual (ECRP 13) who is can walk the insured 1 through the steps of the post-accident process.

Typically, the insured 1 has not been in any accidents, or the last accident was a while ago. The inured 1 does not remember the steps that (s)he performed after the previous accident, and most likely does not know what the current process is now. Therefore, the insured 1 will most likely want a professional who (s)he trusts direct him/her to perform the proper steps and acquire the proper information.

The ECRU 300 has a list of actions to be performed and information to be acquired stored in the pre-programmed memory (309 of FIG. 3). These generally include:

a. emergency response actions, and b. on the scene information acquisition to settle the claim.

This is one of the customer services which will set the companies using the current system apart from the others by offering a useful and meaningful personal service at the time the insured 1 needs it most.

The ECRU 300 can be embodied several different ways. In a first embodiment, prompts are only provided to the ECRP 13 on an input and output (I/O) device near the ECRP 13. I/O devices 205, 305 may include touchscreens, keyboards, mice, trackballs, monitors, touchpads, speakers, microphones, etc. The ECRP 13 then communicates via video with the insured 1.

In another embodiment, at least some of the instructions are provided to the insured's communication device 200. These may be in the form of questions with buttons to answer the questions, arrows, icons, etc. For example, the ECRU 300 may display to ECRP 13 instructions to acquire video of the damage to the insured's vehicle 15. The ECRP 13 will speak via video to the insured 1 asking the insured to hold the insured's computing device 200 near the damaged portion of the insured's vehicle 15 so that camera (207 of FIG. 3) acquires live video feed of the vehicle. The ECRP 13 can then use overlay device 317 to overlay arrows on the I/O device (205 of FIG. 3) of the insured's computing device 200 which indicate which way the insured 1 should move the camera (207 of FIG. 3). These arrows may also include curved arrows indicating a change in orientation of the camera 207 in several different dimensions.

Symbols may also be used to indicate that the insured 1 should zoom in, zoom out, etc.

The I/O devices 205, 305 may allow the insured 1 and the ECRP 13 to circle or otherwise indicate desired structures, objects or features by use of touchscreen or similar technology.

To acquire accurate information quickly, it is best to get an overall visual indication of the accident scene. In step 917, ECRU 300 instructs the ECRP 13 to speak with the insured 1 to point the camera (207 of FIG. 3) toward the accident scene. The ECRP 13 may provide additional direction to the insured 1 acquire videos in various directions. These videos may indicate emergency conditions which the insured 1 is not aware. For example, the videos may indicate a possibly a potential fire situation is a fuel spill is shown. The videos also may give an indication of the severity of the accident and the number of vehicles involved.

a. Emergency Response Actions

In step 919, ECRU 300 prompts ECRP 13 to ask the insured 1 several questions to determine if an ambulance is necessary. Based upon responses given by the insured 1 and/or the video feed from the scene, the ECRP 13 decides on whether an ambulance is needed.

If the accident is minimal and no one is injured, the ECRP 13 may decide that an ambulance is not necessary ("no"). In this case, the ECRP 13 indicates to the ECRU 300 that one is not necessary, and processing continues at step 923.

If an ambulance is necessary ("yes"), then the ECRP 13 makes a selection through the UCRU 300 to indicate that an ambulance is necessary. In this case, control unit 301 receives the current location of the accident determined by the GPS 203 of insured's computing device 200, and searches through a database 340 of FIG. 3 of areas covered by ambulance companies to determine an appropriate ambulance company 1110 and sends a notification requesting service and providing the GPS location of the accident scene 19.

Optionally, the insured 1 is directed to acquire information of the identity of persons injured and to what extent he/she is injured.

Similarly, the ECRP 13 asks the insured 1 if the police are at the scene 19 or have been notified. Since the current system 1000 is so efficient and is up an operable very quickly, the insured will, most likely, be at this step before anyone has determined which police department covers the accident scene 19 and contacts them.

If the accident is minimal, the ECRP 13 may decide that the police are not necessary ("no"). In this case, the ECRP 13 indicates to the ECRU 300 that it is not necessary to contact the police, and processing continues at step 929.

If it is decided that the police are necessary ("yes"), then in step 929 the ECRP 13 makes a selection through the ECPU 300 to indicate that the police are necessary. In this case, control unit 301 again uses the current location of the accident, and searches through the database 340 the police department having responsibility for the accident scene 19 and sends a notification to the appropriate police department 1120 requesting service and providing the GPS location of the accident scene 19.

Similarly, the ECRU 300 directs the ECRP 13 to ask the insured 1 if other first responders (fire paramedics, volunteer first responders) are at the scene 19 or have been notified.

If the accident is minimal, the ECRP 13 may decide that the first responders are not necessary ("no"). In this case, the ECRP 13 indicates to the ECRU 300 that it is not necessary to contact the police, and processing continues at step 933.

If the fire department or other first responders are necessary ("yes"), then in step 933 the ECRP 13 makes a selection through the ECPU 300 to indicate that first responders are necessary. In this case, control unit 301 again uses the current location of the accident, and searches through the database 340 for appropriate first responders and sends a notification to at least one first responder's office 1120 requesting service and providing the GPS location of the accident scene 19.

a. Information Acquisition

After the appropriate emergency response personnel have been requested, information at the accident scene should be acquired before it is changed or lost. Therefore, it would be helpful to video the accident scene 19 to acquire the positions of the vehicles, and their orientations, as indicated above.

Also, witnesses 3 typically leave the scene 19 quickly, and if they do not leave contact information. Later it is very difficult to find and contact them.

In step 933, the ECRU 300 prompts the ECRP 13 to ask the insured 1 if there were any witnesses. The ECRP 13 may cause the ERCU 300 to play back videos of the scent 19 and try to determine if there were any witnesses 3, or participants 5 which may be the driver of the other vehicle 17, or its passengers. The participants 5 may also include any passengers in the insured's vehicle 15.

If there are no witnesses ("no"), then processing continues at step 941.

If there are witnesses, then in step 935, the ECRU 300 directs the ECRP 13 to instruct the insured 1 to approach one of the witnesses 3 and offer the insured's computing device 200 to the witness 3.

If the witness 3 accepts the insured's computing device 200, the ECRP 13 is directed to notify the witness 3 that (s)he is employed by the insurance company and this video is being recorded, and requests that the witness 3 simply indicate what (s)he saw.

If the witness 3 agrees, the video feed of the witness 3 is recorded.

The ECRP 13, prompted by the ECRU 300 interacts with the witness 3 to acquire information.

When finished, in step 939 it is determined if there are other witnesses 3 which have not yet had a chance to indicate what they have seen.

When all witnesses 3 have been asked, the process shown in steps 941-947 is repeated for the participant in the accident.

Finally, in step 949, the ECRU 300 prompts ECRP 13 to request a video statement from insured 1.

In step 951 it is determined if all available information has been acquired. If so ("yes"), then processing continues at step 957.

If not ("no"), then in step 953, the ECRU 300 directs ECRP 13 to request that the insured 1 answers questions, acquires video feed of objects, people or scenes, or offers the insured's computing device 200 to another person to provide information or otherwise use the device.

For example, the ECRP 13 may instruct the insured 1 to acquire additional video of damage to the insured's vehicle 15 and the other vehicle 17. As indicated above, ECRP 13 can use arrows, icons or verbal descriptions to instruct the insured 1 when acquiring video feed.

In step 955 it is determined that if there are other video feed required or if there are people on the scene that the ECRP 13 would like to talk with ("yes"), then step 953 will be repeated.

In step 955 if it is believed that no required information that is currently available has been omitted ("no"), then the insured 1 is notified that an Adjuster of the carrier insurance company will use the acquired information and videos and follow up with the insured 1 within a few days.

The process stops at step 959.

FIG. 3 is a more detailed block diagram of one embodiment of a system in accordance with the present invention. This more specifically indicates the structure and operation of one embodiment of the current invention.

There are many video hosting services available. Some are browser-based and others use proprietary software clients at the user side.

For example, WebEx requires that a proprietary WebEx client be downloaded and configured for use. Another example is "GotoMeeting.com". This also requires a download of software and configuration to use the service.

Similarly, there are other videoconferencing services that require the user to download proprietary client software to use the service.

"Appear.in" and "Megameeting.com" are two videoconferencing services that allow a user to connect to a videoconferencing service with a browser. "Appear.in" employs an RTC format for communications between the user and the Appear.in server.

Megameeting.com employs a different format and employs Flash technology by Adobe.

The major browsers used are Firefox, Google Chrome, Microsoft's Internet Explorer and Microsoft's Edge.

There are numerous browser plug-ins and add-ons that can be downloaded and installed in the browsers which will allow the browsers to use these, and other videoconferencing services. However, as indicated above, one goal of the current invention is to reduce or eliminate the requirement of downloading and installing software. The insured 1 does not want to spend time and effort downloading and installing software immediately after an accident.

For those who try to download and install software, they may incorrectly install it, or may configure it improperly. This may cause the site to function improperly, or not at all. The user, most probably, will go to a different website. Therefore, another potential customer is lost.

Browsers are now distributed with inherent capabilities and have pre-installed plug-ins. For example, Firefox is distributed with the capability of running RTC communications format with no additional plug-ins, add-ons, or extensions.

Therefore, Firefox is compatible with the communications format for Appear.in videoconferencing. However, Firefox, in its current distribution, cannot run Flash-based videoconferencing of Megameeting.com.

Similarly, Chrome can run RTC format communications, but cannot run Flash-based videoconferencing service of Megameeting.

Internet Explorer, without modification, is capable of running the Flash-based Megameeting, but is not compatible with Appear.in.

Anyone using an iPhone, iPad or Apple laptop or Apple desktop computer would be running an entirely different set of software than any of those described above. This is because these are all based upon the Apple Operating System.

Facetime is an Apple proprietary videoconferencing service that runs on Apple mobile devices that run on iOS, and Macintosh computers that run Mac OS X (version 10.6.6 and later versions). Therefore, the company needs a device which runs iOS or Mac OS X to communicate with a potential client on an Apple device.

The current system 1000 employs an App 211 which is preprogrammed by the Agent when visiting the Agent's office, or is preprogrammed by the insured 1 following instructions provided by the insured's Agent.

In a second embodiment, as described above, a visual code, such as a QR code is provided to the insured 1. When this is scanned, it loads the information specific to the insured 1 having information identifying the insured's identity and having a URL that connects the insured's computing device 200 to the director 1500.

In the case where the App 211 is not preprogrammed and there is no visual code to scan, the App 211 may use a general-purpose web browser, such as Firefox 210 by Mozilla, Google Chrome 220, Internet Explorer 710 (IE) by Microsoft, Microsoft Edge 720. Some of these are also available for the Apple iOS operating system.

FIG. 3 shows a specific implementation of the system 1000. Control unit 201 starts up and begins executing the instruction of App 211. In this embodiment, App 211 employs Firefox 210 as the communication program to make a connection to a video hosting server.

Since the App 211 was not preprogrammed and preprogrammed memory 209 was not previously initialized with the information required to make a connection and no visual code is available to scan, configuration must be done by the director 1500.

The director 1500 is capable of either automatically sensing the operating system and the type of browser that the insured 1 is running. Then, the system then determines that the insured's computing device 200 will communicate in an RTC format. Therefore, it then decides that it would be best to connect to the "Appear.in" web hosting server 7 which is an HTML5 platform.

Director 1500 then notifies ECRU computing device 300 to employ an RTC format communication program which may be either the Firefox 310 or Chrome 320 browsers and indicates to connect to the "Appear.in" web hosting server 7. The director 1500 also provides the video session number and any login information that was provided by "Appear. in" web hosting server 7 when insured's computing device 200 set up the conference.

Therefore, the insured's computing device 200 can be used in its 'native form' without the need for downloads or configuration by the insured 1 to make a video connection with ECRP 13 at a remote location.

Figure 4:
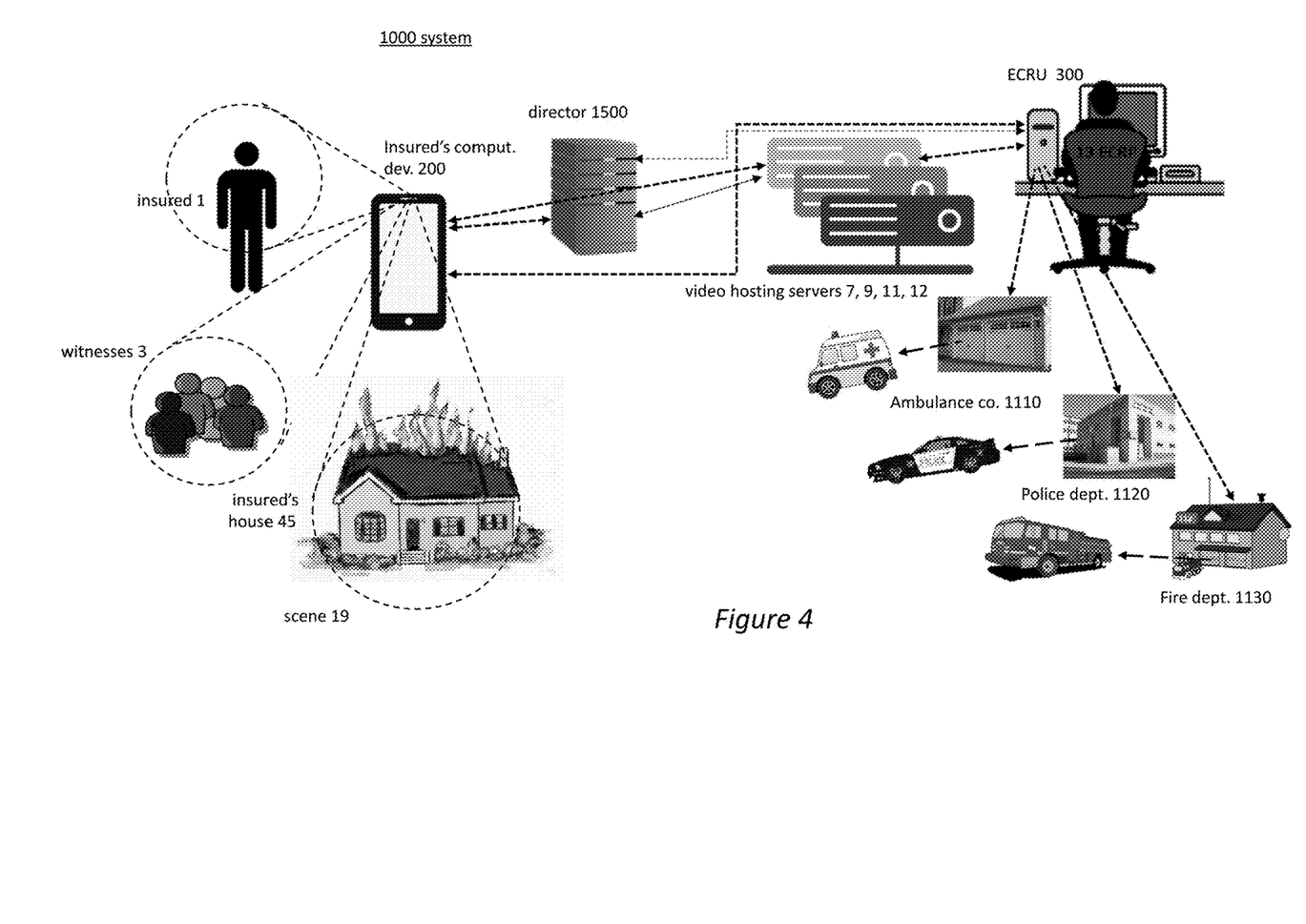
FIG. 4 is a more detailed block diagram of one embodiment of a system in accordance with the present invention illustrating its implementation after a house fire.

FIGS. 3 and 4 illustrates its implementation of system 1000 after a house fire. Insured 1 starts a pre-stored App that makes contact with the director 1500. As described above, the App 211 may have been preconfigured with information identifying the insured 1, the video hosting server to connect to and information indicating the Carrier and coverage.

In an alternative embodiment, the App has not been preconfigured, and the insured 1 is instructed to scan a visual code on an insurance card, a sticker placed on the insured's vehicle, a refrigerator magnet provided by the insurance Carrier or Agent, or other object provided by the Carrier or Agent. The camera 207 and executable code in the App will cause the insured's computing device 200 to decode information embedded in the visual code and use this to identify the insured 1 and his/her Carrier and policy information.

The director 1500 directs the insured's computing device 200 to link to a compatible video hosting server 7. Director 1500 also provides information to ECRU 300 causing it to also connect to the compatible video server 7 to make an interactive video link between the insured 1 and ECRP 13.

A camera 307 in ECRU 300 acquires a video feed of the ECRP 13. The I/O device 305 includes a microphone for acquiring audio from the ECRP 13. The audio and video are sent via the video link to the insured's computing device 200. These allows the ECRP 13 to speak directly with, calm down and instruct insured 1.

Similarly, the images from camera 207 and audio acquired by a microphone in the I/O device 205 of the insured's computing device 200 are also sent over the video link to the ECRU 300/ECRP 13.

From this point forward, ECRP 13, in combination with the ERCU 300 controls the post-accident process, and information and video collection required to make a claim for reimbursement to the Carrier.

ERCP 13/ERCU 300 requests the insured 1 to video the house, fire damage, and the accident scene 19. As indicated above, the ECRP 13/ECRU 300 can activate overlay device (317 of FIG. 3) to overlay arrows and/or symbols on the I/O device (205 of FIG. 3) indicating to the insured which way to move the insured's computing device 200 to acquire a desired video feed.

ERCP 13/ERCU 300 also instruct the insured to approach witnesses 3 and request a statement from them while handing them the insured's computing device 200.

If the witness 3 is willing, he/she is notified that they are being recorded and asked to provide a description of what they saw.

After all the available information is acquired, the insured 1 is notified by the ECRP 13/ERCU 300 that they will be hearing from the Carrier within a few days to settle the claim.

All the acquired information is provided to the ECRU 300 to be used by the ECRP 13 to file a claim for reimbursement. Since most of the information has been acquired, the Adjuster has very little to do to complete the claim evaluation which should greatly accelerate the insurance claim process.

The current system 1000 quickly and easily acquires information required to file an insurance claim. The information is first-hand and is much more accurate compared with prior art method of processing insurance claims. This significantly reduces the costs and time for settling insurance claims which will result in much faster reimbursements of the insured 1, and a substantial cost savings for the Carrier.

Although a few examples have been shown and described, it will be appreciated by those skilled in the art that various changes and modifications might be made without departing from the scope of the invention, as defined in the appended claims.

What is claimed is:

1. A system which enables an Emergency claims Response Person (ECRP) to take control of an accident situation by directing an insured to stabilize the accident scene, and collect information and video feeds for remotely assisting the insured in filing an accident insurance claim comprising:
   a. an insured user's computing device comprising:
      i. a camera adapted to acquire video feeds from the accident situation as indicated by an Emergency claims Response Person (ECRP);
      ii. an input and output device (I/O) having a microphone adapted to acquire audible sounds from the accident situation as indicated by the ECRP;
      iii. at least one communication program adapted to provide the audio sounds and video feeds from the accident situation to a remote server;
      iv. a positioning device which can determine a location of the insured user's computing device; and
      v. a control unit adapted to run a predetermined application (App) which contacts the remote server, and requests that a video conference immediately be set up with the ECRP of an emergency claim response unit (ECRU) in order to remotely assist the insured in filing an accident insurance claim;
   b. the Emergency claim Response Unit (ECRU) comprising:
      i. a camera adapted to acquire video feeds of the ECRU;
      ii. an input and output device (I/O) having a microphone adapted to acquire audible sounds of the ECRU,
      iii. at least one communication program adapted to connect to the remote server, and provide the audio sounds and video feeds of the ECRU to the remote video hosting server;
      iv. a pre-programmed device having instructions for a post-accident process for assisting the insured in filing the accident insurance claim; and
      v. a control device, adapted to execute the instructions for the post-accident process and prompt the ECRP to instruct the insured through the process for filing the accident insurance claim; and
   c. a director adapted to:
      i. receive the request from the insured user's computing device that the video conference immediately be set up with the ECRP of an emergency claim response unit (ECRU) and facilitate a connection with the remote server which is compatible with the communication program of the insured user's computing device;
      ii. determine if the remote server is compatible with the insured user's computing device; and
      iii. responsive to determining that the remote server is compatible with the insured user's computing device, facilitate the connection of the ECRU to the remote server that the insured user's computing device is connected to, and use the communication program which is compatible to the remote server that the insured user's computing device is connected to thereby allowing the ECRP to create a video link and assist the insured user through the process for filing the accident insurance claim.

2. The system of claim 1, wherein at least one of the I/O device of the ECRU and I/O device of the insured user's computing device displays a post-accident instruction for filing the accident insurance claim.

3. The system of claim 2, wherein the ECRU sends video feeds and audio sounds of the ECRU verbally directing the insured through at least one of a post-accident instruction for filing the accident insurance claim.

4. The system of claim 3, wherein at least one of the post-accident instruction includes directing the insured to acquire video of at least one object, scene or person.

5. The system of claim 3, further comprising:
   an overlay device which generates overlays which are displayed on the insured user's I/O device indicating actions for the insured user to execute.

6. The system of claim 5, wherein the overlay device generates visible overlays that are arrows showing which direction the insured user should move the camera of the insured user's computing device.

7. The system of claim 1, further comprising:
   a. a pre-programmed storage device which includes executable code for extracting information from a visual code; and
   b. a control device which executes the executable code causing the control device to extract information from the visual code when the camera scans the visual code.

8. The system of claim 7, wherein the visual code is one of a bar code or a QR code.

9. The system of claim 1 wherein preprogrammed device has prestored instructions that comprise at least one of:
   a. an instruction to acquire video feeds of the accident scene;
   b. an instruction to acquire video feeds of injuries of at least one person injured in the accident; and
   c. an instruction to acquire video feeds of damage to property.

10. The system of claim 1, wherein the preprogrammed device includes instructions for a post-accident process for filing the accident insurance claim of one of an auto accident, a building fire, an animal attack, a slip and fall injury.

* * * * *